(12) United States Patent
Roeingh et al.

(10) Patent No.: US 7,836,742 B2
(45) Date of Patent: Nov. 23, 2010

(54) DEVICE FOR SEALING THE BALL SIDE OF A BEARING OF A ROLLER STUD

(75) Inventors: Konrad Roeingh, Hilchenbach (DE); Karl Keller, Hilchenbach (DE); Kurt Scheffe, Hilchenbach (DE)

(73) Assignee: SMS Siemag Aktiengesellschaft, Dusseldorf (DE)

( * ) Notice: Subject to any disclaimer, the term of this patent is extended or adjusted under 35 U.S.C. 154(b) by 626 days.

(21) Appl. No.: 10/586,985

(22) PCT Filed: Jan. 18, 2005

(86) PCT No.: PCT/EP2005/000427

§ 371 (c)(1),
(2), (4) Date: Jul. 2, 2007

(87) PCT Pub. No.: WO2005/071278

PCT Pub. Date: Aug. 4, 2005

(65) Prior Publication Data

US 2007/0290448 A1    Dec. 20, 2007

(30) Foreign Application Priority Data

Jan. 23, 2004  (DE)  ........................ 10 2004 003 763

(51) Int. Cl.
*B21B 27/06*  (2006.01)
*B21B 28/00*  (2006.01)

(52) U.S. Cl. ............................. 72/236; 72/43
(58) Field of Classification Search ................... 72/237, 72/199, 228, 425, 41, 43, 236; 277/349, 277/402, 420, 348, 565
See application file for complete search history.

(56) References Cited

U.S. PATENT DOCUMENTS 3,107,718 A * 10/1963 Ruple ........................ 72/236

(Continued)

FOREIGN PATENT DOCUMENTS

DE        24 14 634        10/1974

(Continued)

OTHER PUBLICATIONS

Patent Abstracts of Japan, BD. 1997, No. 6, Jun. 30, 1997 & JP 09 049572 A (Koyo Seiko Co LTD), Feb. 18, 1997.

*Primary Examiner*—Dana Ross
*Assistant Examiner*—Mohammad Yusuf
(74) *Attorney, Agent, or Firm*—Lucas & Mercanti, LLP; Klaus P. Stoffel

(57) ABSTRACT

The invention relates to a device (1) for sealing the ball side of a bearing of a roller journal (2), comprising a journal bushing (3) which is drawn to the roller journal (2), said journal bushing being associated with a bearing ring (5), a bearing bushing (7) which is mounted in an insertion piece (6), also comprising radial shaft seals which are associated with the insertion piece via a holder (11) and which are provided with radial lips (13, 13) which co-operate with the bearing ring (5) and a sealing arrangement (16) which is arranged upstream from the radial shaft seals so that the roller (4) can roll. The aim of the invention is to improve said device in such a way that it can be produced and operated economically such that it consists of only a small number of parts and has an improved sealing effect. According to the invention, the holder (11), the radial lips (13, 13), and a sealing lip (15, 15') of the sealing arrangement (16) form one unit which is sealingly connected in a detachable manner to the insertion piece (6).

13 Claims, 4 Drawing Sheets

U.S. PATENT DOCUMENTS

| | | | | |
|---|---|---|---|---|
| 4,103,406 A | * | 8/1978 | Ito et al. | 72/182 |
| 4,455,856 A | * | 6/1984 | Salter et al. | 72/236 |
| 4,679,801 A | * | 7/1987 | Poloni | 277/349 |
| 5,927,867 A | * | 7/1999 | Niebling et al. | 384/539 |
| 6,082,905 A | * | 7/2000 | Vignotto et al. | 384/484 |
| 6,866,270 B2 | * | 3/2005 | Keller et al. | 277/349 |
| 7,566,293 B2 | * | 7/2009 | Leisten et al. | 277/351 |

FOREIGN PATENT DOCUMENTS

| | | |
|---|---|---|
| DE | 298 05 241 | 8/1999 |
| DE | 101 13 593 | 9/2002 |
| EP | 1 038 601 | 9/2000 |
| EP | 1038601 A2 * | 9/2000 |
| FR | 2 676 943 | 12/1992 |

* cited by examiner

DEVICE FOR SEALING THE BALL SIDE OF A BEARING OF A ROLLER STUD

The invention concerns a device for sealing the barrel side of a roll neck bearing, with a sleeve, which is fitted on the roll neck and to which a race is assigned; with a bearing bush supported in a chock; with rotary shaft seals, which are coordinated with the chock by a mounting and have radial lips that interact with the race; and with a sealing assembly arranged in front of the rotary shaft seals towards the barrel of the roll.

There are essentially two different designs for sealing the bearings of a neck of a rolling mill roll. One design works with a journal shaft seal, which rotates with the roll, and whose sealing lips press against the opposing bearing surface with variable force at different speeds due to centrifugal force. This can result in increased generation of heat, which has a negative effect on the rubber material of the journal shaft seal with respect to its flexibility, volume, and hardness, so that these seals are optimally designed for only a small window of operation.

The second design works with stationary rotary shaft seals, in which no centrifugal force problems arise. A device of this type for sealing the barrel side of a roll neck bearing is disclosed, for example, in DE 101 13 593 A1. This sealing device comprises a relatively large number of individual parts, including two rotary shaft seals. Since each of the rotary shaft seals is about as expensive as the journal shaft seal of the first design, this device for sealing the barrel side of a roll neck bearing is very expensive. Furthermore, the assembly of the many individual parts of this seal is very labor-intensive. This results in complicated handling for the assembly and maintenance of the sealing device and also adds to its expense. In addition, only a labyrinth seal is arranged in front of the rotary shaft seals towards the barrel of the roll, and the labyrinth seal does not always reliably protect the rotary shaft seals from contaminants coming from the roll, such as scale.

DE 296 20 018 U1 discloses a device of this general type, but it also consists of many individual elements that are assembled to form a unit. Therefore, in this case as well, changing a sealing device is labor-intensive, and the assembly of the device for sealing the barrel side of the bearing is cost-intensive.

U.S. Pat. No. 4,679,801 discloses a device of this general type, in which a large number of individual parts is still needed for constructing the device for sealing the barrel side of the roll neck bearing. In particular, this document discloses a labyrinth seal arranged in front of the seal, but this labyrinth seal consists of several individual parts.

FR 2 676 943 discloses a sealing assembly for roll necks with a one-part sealing element, but in this case sealing lips are disclosed which act only in the radial direction.

The objective of the invention is the further development and optimization of a device of this general type in such a way that it can be inexpensively built and operated, consists of only a few parts, and produces a better sealing effect.

To achieve these goals, it is proposed that the mounting, the radial lips, and the sealing assembly form a unit that is detachably joined with the chock to provide a seal.

Unlike the prior art, the sealing assembly does not involve merely a labyrinth seal but rather additionally a sealing lip, which forms a unit with the radial lips and the mounting. As a result, instead of a multipart mounting and the two-part rotary shaft seals, only one element is required, which, in addition, also has an additional sealing lip as a sealing assembly that protects the radial lips from contaminants arising from the surface of the roll.

It has been found to be effective for the mounting, the radial lips and the sealing assembly to be designed as a single part. This ensures that in fact only one element, which serves both mounting and sealing purposes, needs to be joined with the chock.

However, it is also possible for the mounting and the radial lips to be constructed as a single part as sealing elements and for the sealing lip of the sealing assembly to be detachably joined with the sealing element.

In particular, if variable wear should occur between the sealing lip of the sealing assembly and the radial lips of the sealing element, there is the possibility of detaching the sealing lip of the sealing assembly, which has greater contact with the scale, and replacing it with a new sealing lip. Although this again requires an additional part for the device for sealing the barrel side of the roll neck bearing, these two parts represent a much smaller number of parts compared to the prior-art device.

It should be noted that the mounting and the radial lips and/or the sealing lip of the sealing assembly are made of different materials. This is accomplished by virtue of the fact that during the manufacture of the sealing device in the suitable manufactured form, different materials are used in the region that serves for mounting from those used in the region of the radial lips, and possibly still other materials are used in the region of the sealing lip of the sealing assembly, all of which are joined, e.g., by vulcanization, so that the device of the invention can be specifically designed to the requirements under consideration in the respective regions.

Materials that can be considered for the mounting include, for example, steel, aluminum, plastic, and hard rubber, while the radial lips and/or the sealing lip of the sealing assembly can be made of acrylonitrile-butadiene rubber, hydrogenated acrylonitrile-butadiene rubber, fluorocarbon elastomer, polytetrafluoroethylene, and polyurethane.

It is advantageous for the sealing element to have an extension on the mounting. At least one radial lip is located at the ends of the extension and has a sealed connection with the race. In this regard, one radial lip can be used. However, the use of two radial lips is preferred, which can be directed in the same or opposite directions. In this way, two sealing lips are realized on an extension. Two different rotary shaft seals are no longer needed.

It is important for the mounting and/or the radial lips and/or the sealing lip to be reinforced. In this regard, the mounting of the sealing element can have reinforcements for stiffening the whole element, while the radial lips have stiff springs or round-steel elements of well-defined length, so that constant contact pressures are guaranteed over the service life of the sealing element. The sealing lip of the sealing assembly can be reinforced, for example, by reinforcing fibers.

An outstanding feature is that the mounting and the extension have a first connection, by which small amounts of oil can be conveyed from an oil collection pocket in the vicinity of the bearing to the region between the two radial lips for the purpose of lubricating the sealing lip that faces away from the bearing with minimal amounts of oil, and that at least the extension has a second connection, by which excess oil can be carried away from the region between the sealing lips.

The radial lip on the bearing side is normally sufficiently lubricated by the oil emerging from the bearing, whereas the radial lip located behind it on the roll side is normally not lubricated. This radial lip could burn during operation. For this reason, this oil is supplied by the first connection of the radial lip on the roll side, even if, for example, only one drop of oil per hour is necessary. If it should happen that too much oil enters the region between the two radial lips by this first connection, so that the radial lips could possibly float up and thus would no longer provide a proper seal, another connection is provided, by which excess oil can be carried away from the region between the radial lips.

When the sealing element has been installed, it is advantageous for the first connection in the respective upper region of the radial lip to be located in about the 12 o'clock position and for the second connection in the respective lower region to be located just before or just after the 6 o'clock position. As a result, the oil drops are supplied in the upper region of the radial lips and can drain downward solely under the influence of gravity. In addition, the race turns on the radial lips and can distribute the oil as it turns.

Excess oil is carried away from the lower region of the radial lips. However, the connections are not located in the 6 o'clock position, i.e., in the lowermost position, but rather just before or just after the 6 o'clock position, so that a small oil sump is always present, which is dimensioned in such a way that the radial lips cannot float up, but lubrication with minimal amounts of oil is guaranteed.

It is advisable to be able to adjust the amount of the oil particles that are collected by the size of the opening of the oil collection pocket and to be able to set the amount of oil that can be stored in the oil collection pocket by the oblique position and the depth of the oil collection pocket. This measure and above all the choice of the diameter of the first connection make it possible to adjust the amount of oil that reaches the radial lips of the sealing element.

It is also advisable for the sealing assembly to cooperate with an L-shaped section mounted on the end face of the roll. The sealing lip of the sealing assembly can rest against the L-shaped section, which rotates with the roll. In this regard, the sealing lip of the sealing assembly can at best apply frictional stress to the L-shaped section, which is replaceably connected with the roll. This does not apply stress to the roll.

In addition, it is advisable for a labyrinth seal to be formed between the sidepieces of the L-shaped section and the sealing element. In this way, in addition to the sealing lip of the sealing assembly, a sealing assembly in the form of a labyrinth seal of the type known from the prior art is formed. The radial lips of the sealing element are thus doubly protected.

It is advantageous if the sealing element can be adjusted on the chock in such a way that an offset that develops during rolling is compensated. This offset is caused by the rolling force during the rolling operation. When this occurs, the roll necks are not centered in the bearing bush. Due to the possibility of adjusting the sealing element, it can be adjusted in such a way that it, like the neck of the roll, is situated eccentrically with respect to the bearing bush, so that the sealing element is thus arranged centrically with respect to the roll neck.

The invention is not limited to use in friction bearings, but rather other types of bearings, e.g., antifriction bearings, can be sealed by the device of the invention.

The invention is explained in greater detail with reference to the drawings.

Figure 1:
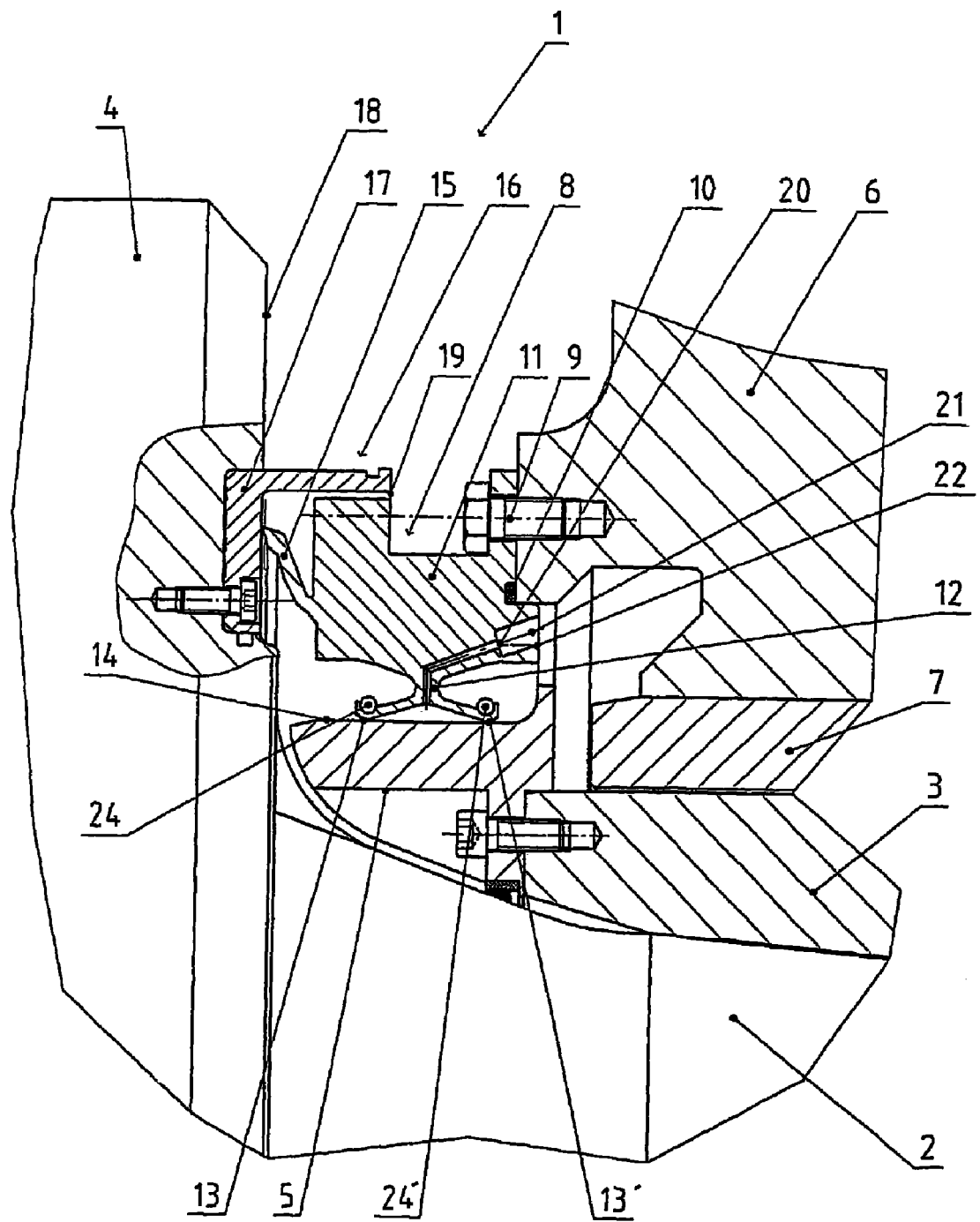
FIG. 1 shows the device of the invention with the mounting, the radial lips, and the sealing lip of the sealing assembly designed as a single part.

FIG. 1 shows a device for sealing the barrel side of the bearing of a roll neck 2. The sleeve 3 is seated on the roll neck 2 of a roll 4. A race 5 is joined with the sleeve 3, in this case by bolting. However, the race 5 can also be joined with the roll 4. The roll 4 is supported in a chock 6, which is provided with a bearing bush 7.

A sealing element 8 is detachably joined with the chock 6 by means of bolts 9. An annular seal 10, which can also be part of the sealing element 8, prevents oil, which emerges between the bearing bush 7 and the sleeve 3, from reaching the roll 4 through a gap between the sealing element 8 and the chock 6. The sealing element 8 consists of a mounting 11, an extension 12, and two oppositely directed radial lips 13, 13' at the end of the extension 12. The radial lips 13, 13' rest against a sealing surface 14 of the race 5.

The sealing element 8 has a sealing lip 15 that is joined as a single part with the mounting 11 and is part of a sealing assembly 16. The sealing assembly 16 also comprises an L-shaped section 17, which is bolted with the end face 18 of the roll 4. The sealing lip 15 rests against and seals one of the sidepieces of the L-shaped section 17. The second sidepiece of the L-shaped section 17 forms a labyrinth seal 19 with a region of the sealing element. The labyrinth seal 19 and the sealing lip 15 constitute the sealing assembly 16.

A connection 20 is located in the mounting 11 and the extension 12. Oil from the bearing between the bearing bush 7 and the sleeve 3 can reach the region between the radial lips 13, 13' through this connection 20. To this end, an oil collection pocket 21 is formed in the mounting 11. The connection 20 and the oil collection pocket 21 are located in the upper region of the sealing element 8 in about the 12 o'clock position. The oil collection pocket 21 is installed laterally in the mounting 11 as a blind hole that runs obliquely downward. The lower edge 22 of the blind hole opening simultaneously serves as an overflow, so that the oil level in the oil collection pocket 21 is determined by the inclination of the blind hole and the height of the lower edge 22 above the bottom of the blind hole. The oil collection pocket 21 can be designed as a circular or oval blind hole, and the lower edge 22 should be designed, if possible, as a straight, tangentially extending edge.

The oil collected in the oil collection pocket 21 can enter the region between the radial lips 13, 13' through the connection 20. Here it serves to lubricate the radial lip 13. The radial lip 13' is lubricated directly by oil from the bearing.

Figure 2:
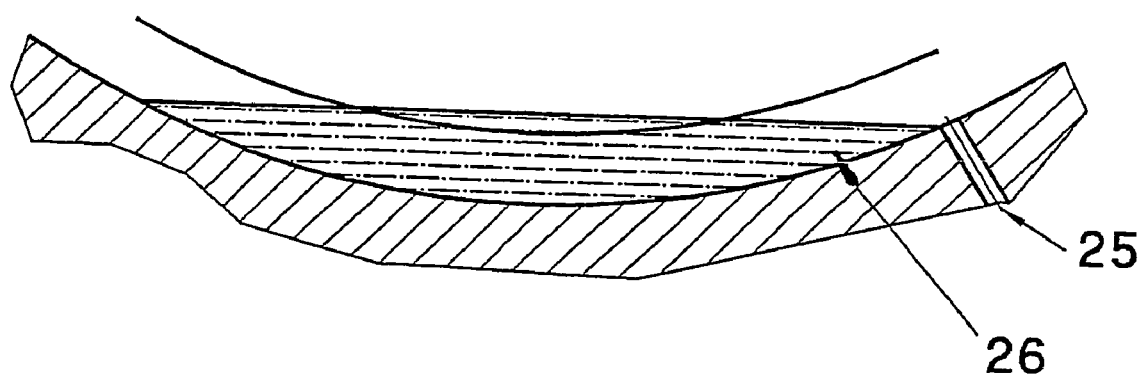
FIG. 2 shows the lower section of the radial lips, showing the second connection.

FIG. 2 shows that, at the lower end of the sealing element 8, there is another connection 25, through which excess oil can flow off from the region between the radial lips 13, 13' and the sealing surface 14. In this regard, the additional connection 25 is arranged in such a way that a small oil sump 26 can be maintained in the region between the radial lips 13, 13' and the sealing surface 14.

Figure 3:
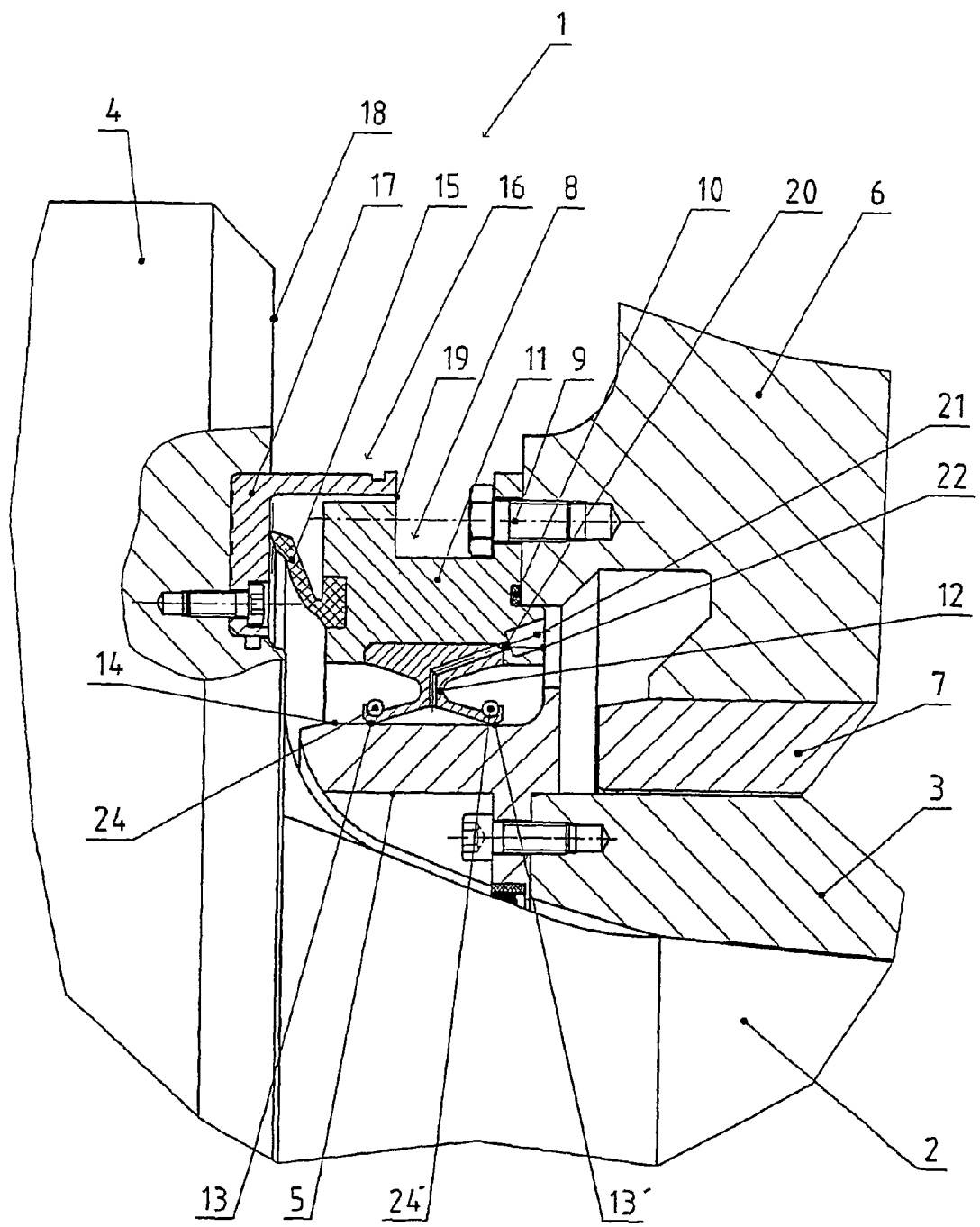
FIG. 3 shows the device of FIG. 1 with the sealing lip formed as a single part but made of a different material.

FIG. 3 shows that the sealing element 8 and the sealing lip 15 are still produced as a single part. However, the sealing lip 15 consists of a different material from the material of the sealing element 8 (indicated by a different type of shading).

Figure 4:
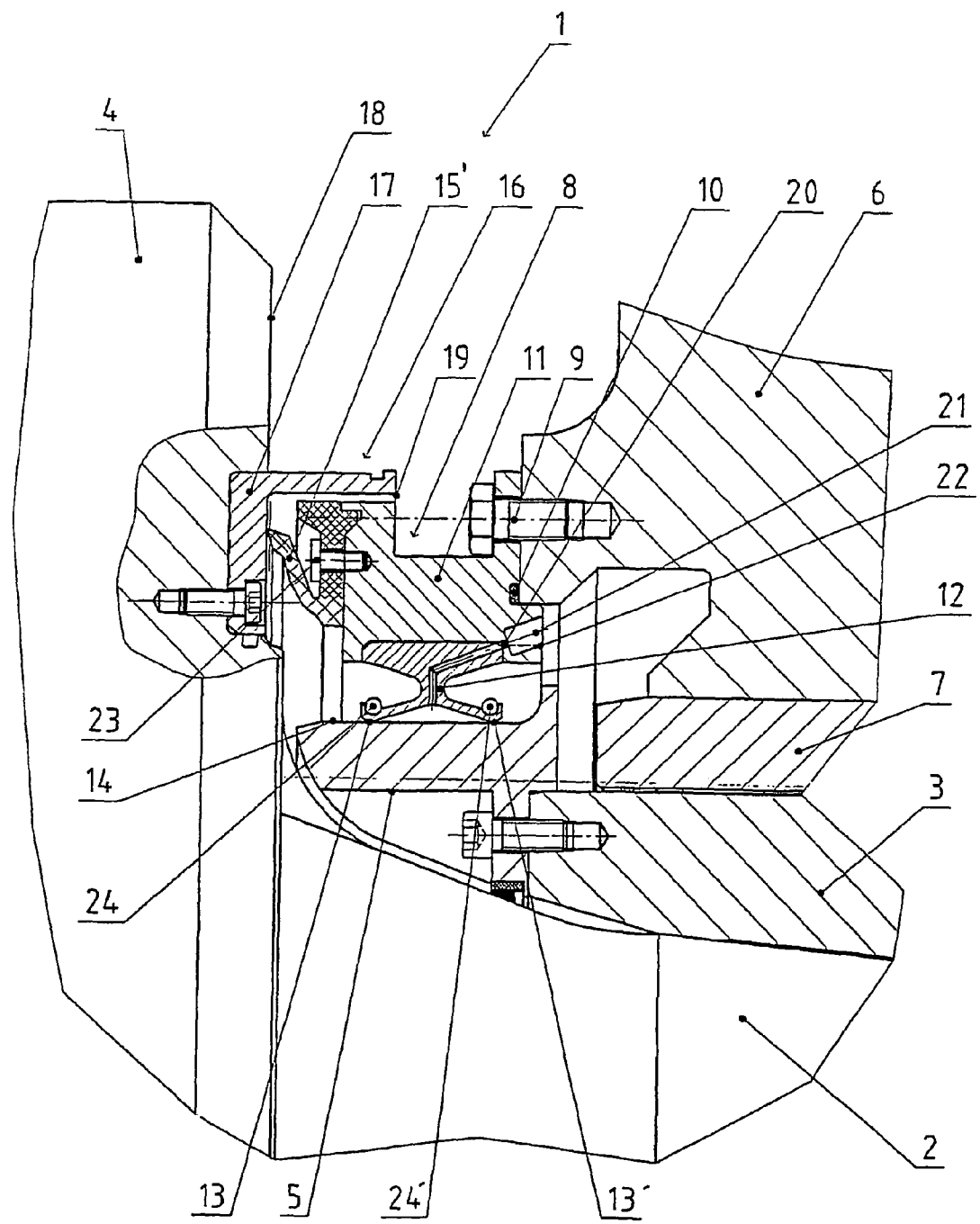
FIG. 4 shows the device of the invention with the mounting and radial lips formed as a single part but with the sealing lip of the sealing assembly detachable.

FIG. 4 shows that the sealing element 8 consists only of the mounting 11, the extension 12, and the radial lips 13, 13'. The sealing lip 15' is joined with the mounting 11 of the sealing element 8 by bolts 23. This allows separate replacement of the sealing lip 15', which is normally subject to greater wear than the radial lips 13, 13'.

It is not shown that the mounting 11 can have reinforcements and that the radial lips 15, 15' are reinforced by a coating or, like the sealing lip 15, 15', are filled with reinforcing fibers.

The shape of the radial lips 13, 13' is maintained by stiff springs 24 or round-steel elements in such a way that an optimum sealing effect between the sealing surface and the radial lips 13, 13' is always guaranteed.

LIST OF REFERENCE NUMBERS

1 device
2 roll neck
3 sleeve
4 roll
5 race
6 chock
7 bearing bush
8 sealing element
9 bolts
10 annular seal
11 mounting
12 extension
13 radial lips
14 sealing surface
15 sealing lip
16 sealing assembly
17 L-shaped section
18 end face
19 labyrinth seal
20 connection
21 oil collection pocket
22 edge
23 bolts
24 spring
25 connection
26 oil sump

The invention claimed is:

1. Device (I) for sealing the barrel side of the bearing of a roll neck (2), with a sleeve (3), which is fitted on the roll neck (2) and to which a race (5) is fixed; with a bearing bush (7) supported in a chock (6); with rotary shaft seals, which are coordinated with the chock (6) by a mounting (11) and have radial lips (13, 13') that interact with the race (5); and with a sealing assembly (16) arranged in front of the rotary shaft seals towards the barrel of the roll (4), wherein the mounting (11) and the radial lips (13, 13') together with a sealing lip (15, 15') of the sealing assembly (16), form a unit that is detachably joined with the chock (6) to provide a seal, wherein amount of oil particles that are collected is adjusted by a size of an opening of an oil collection pocket (21) formed in the mounting (11) and that the amount of oil particles that are stored in the oil collection pocket (21) is set by an oblique position of the oil collection pocket (21) relative to the horizontal rolling axis of the roll (4) and a depth of the oil collection pocket (21).

2. Device in accordance with claim 1, wherein the sealing element (8) and the sealing lip (15) of the sealing assembly (16) are formed as a single part.

3. Device in accordance with claim 1, wherein the sealing lip (15') of the sealing assembly (16) can be detachably connected with the sealing element (8).

4. Device in accordance with claim 1, wherein the mounting (11) and/or the radial lips (13, 13') and/or the sealing lip (15, 15') of the sealing assembly (16) consist of different materials.

5. Device in accordance with claim 1, wherein the mounting (11) has an extension (12), at the end of which there is at least one radial lip (13, 13') that has a sealed connection with the race (5).

6. Device in accordance with claim 5, wherein the mounting (11) and/or the radial lips (13, 13') and/or the sealing lip (15, 15') have reinforcements.

7. Device in accordance with claim 5, wherein the mounting (11) and the extension (12) have a first connection (20), by which small amounts of oil can be conveyed from an oil collection pocket (21) in the vicinity of the bearing to the region between the two radial lips (13, 13') for the purpose of lubricating the sealing lip (13) that faces away from the bearing with minimal amounts of oil, and that at least the extension (12) has a second connection (25), by which excess oil can be carried away from the region between the radial lips (13, 13').

8. Device in accordance with claim 7, wherein when the sealing element (8) has been installed, the first connection (20) in the respective upper region of the radial lips (13, 13') is located in about a 12 o'clock position and that the second connection (25) in the respective lower region of the radial lips (13, 13') is located just before or just after a 6 o'clock position.

9. Device in accordance with claim 1, wherein the sealing element (8) can be adjusted on the chock (6) for the purpose of offset compensation.

10. Device in accordance with claim 9, wherein the sealing element (8) is arranged eccentrically in the chock (6).

11. Device in accordance with claim 1, wherein the sleeve and the bearing bush are part of a friction brake.

12. Device in accordance with claim 1, wherein the bearing is an antifriction bearing.

13. Device in accordance with claim 1, wherein the sealing assembly (16) has an L-shaped section (17) mounted on the end face (18) of the roll (14), a labyrinth seal (19) is formed between the sidepieces of the L-shaped section (17) and the sealing element (8), and the sealing lip (15, 15') rests against and seals the L-shaped section (17).

* * * * *